Dec. 14, 1937.  K. SLIDELL  2,101,961
TREATMENT OF WATER
Filed Oct. 31, 1934
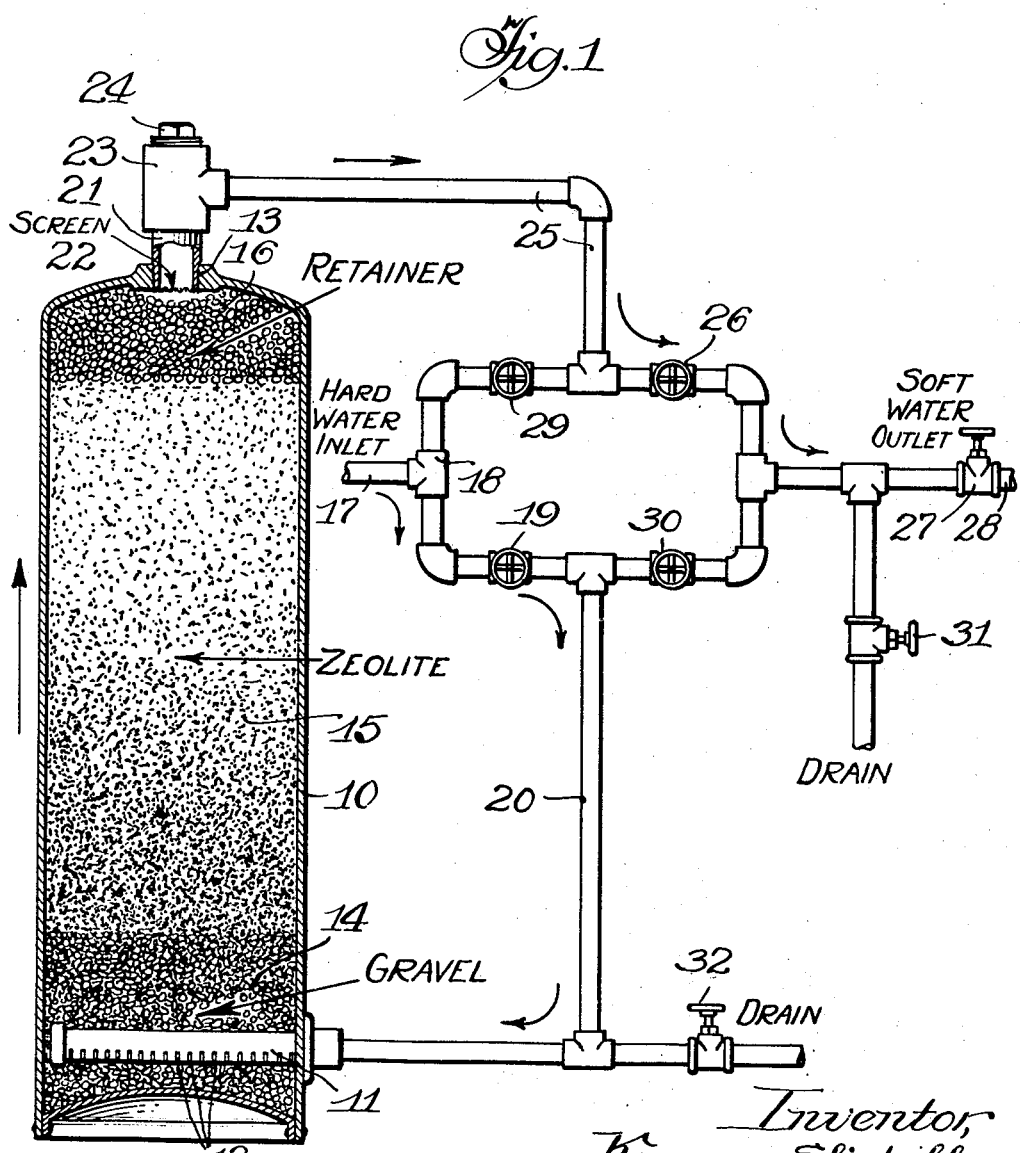

Patented Dec. 14, 1937

2,101,961

UNITED STATES PATENT OFFICE 2,101,961

TREATMENT OF WATER

Kemper Slidell, Madison, Wis., assignor to C. F. Burgess Laboratories, Inc., Chicago, Ill., a corporation of Delaware Application October 31, 1934, Serial No. 750,882

9 Claims. (Cl. 210—24)

This invention relates to improvements in the treatment of water and more particularly to a water softening apparatus of the character in which a base exchange zeolite is used.

One object of the invention is to provide an apparatus of this character which is of simple design and is inexpensive to construct.

Another object is to provide an apparatus which has larger water softening capacity for its size than that of apparatus of the ordinary construction.

Contributory objects are: to provide a layer of retaining material on top of the zeolite bed which effectively prevents the passage of zeolite particles therethrough during the upward flow of water and which insures an even distribution of the flow, and to provide a layer of retaining material comprising particles which are lighter than water and which have rough or pitted surfaces.

In the drawing:

Fig. 1 is a part sectional and part diagrammatic view of apparatus for carrying out the present invention; and Fig. 2 is a view, in elevation, of a hopper for containing salt for regenerating purposes.

In water softening apparatus of the zeolite or base exchange type, the water to be softened may flow either downwardly or upwardly. If it flows downwardly, it is the usual practice to give the softening material an occasional backwash, during which operation the water is caused to flow upwardly through the material at a relatively rapid rate in order to wash away any sediment which may have accumulated upon the top of the zeolite bed and to cause the particles to "breakup" and rise and separate, and in this manner counteract any tendency there might have been for the particles to cake together during use. During this action, the particles rearrange themselves so that the sizes are substantially uniform at the different levels of the bed. However, during said upward flow of water, precautions must be taken in order that it does not carry away some of the water softening material.

The usual practice is to provide sufficient space or "free board" above the zeolite bed to permit such zeolite grains as are carried upwardly by the water stream, to come to rest and settle back into the zeolite bed. The zeolite particles are of a specific gravity greater than that of water and normally do not float. However, due to the relatively rapid rate of flow through the bed, an appreciable quantity of the particles is carried upwardly, but, due to the relatively slow rate of flow of water through the "free-board" space, the lifting action is not sustained and the particles settle back down upon the top of the zeolite bed. Considerable space is necessary to insure that none of the particles are carried into the outlet port of the container. This requires the use of a housing which is larger than that necessary to serve merely as a container for the softening material and for the gravel that is usually beneath the former.

It is also common practice to provide screens at the top of the bed. However, considerable unoccupied space must also be provided about the screens or they will become clogged with zeolite particles during use. It is also the practice to have the softening container substantially filled with zeolite and have the top screen embedded in the zeolite. In such an arrangement, the zeolite above the middle of the screen is more or less inactive and is not utilized. The attrition of the zeolite against the screens is considerable, with the result that it is reduced to fine particles which pass through the screen and are lost.

The present invention provides retaining means at the top of the container which acts positively to prevent the passage of zeolite particles therethrough and which occupy only a relatively small space in the water softening container. The retaining means comprise a body of floating aggregate particles having particular characteristics to suit them to the purpose, as will be described hereinafter.

In Fig. 1 is illustrated a water softening container 10 of the ordinary type having, near the bottom, a distributor pipe 11 with slits 12 or other openings therein and having a port 13 at the top, the distributor and the port being connected to a system of piping, hereinafter described, whereby water may be caused to flow upwardly or downwardly through said container.

Within the container and upon the bottom thereof is a layer of gravel 14, upon which is a body of base exchange zeolite particles 15. Upon the top of the zeolite bed is a layer of the retaining material 16 which characterizes this invention. While it is satisfactory to use any quantity of the material which will perform the desired retaining function, it is preferred that the container be substantially filled above the zeolite bed, although not packed tightly. Sufficient freedom should be provided for the particles of zeolite and retaining material so that they may move about and be kept in a state of motion by the upwardly flowing water.

The thickness of the retaining layer 16 is governed by operating conditions. If the upward flow is relatively rapid, a thicker layer is required than if the flow is slower. Ordinarily, a flow rate is used which is not in excess of ten gallons per minute per square foot of cross-sectional area within the softening tank and such flow rate should not require a layer more than six inches thick, if the particles are of the correct shape and surface characteristics. The large free board spaced usually necessary is avoided, with the result that for the same size container, more zeolite and hence greater capacity is possible than in the ordinary practice.

The material 16 comprises particles which are relatively large in comparison with the zeolite particles. The latter comprises particles which are largely between 14 and 35 mesh in size with small proportions which may be smaller and larger. The preferred size for the particles of retaining material is between ⅛ inch mesh and ⅜ inch mesh. With use, the larger of the particles rise to the top of the layer.

The particles should have an apparent density less than that of water. By apparent density of a particle is meant the density of the particle as a whole, not merely the material of which it is composed. Said material may be heavier than water but the particle may be cellular or porous so as to float. This material should be water resistant also, and should not react with the ingredients of the water to cause disintegration, nor should it impart undesirable properties to the water. Material having base-exchange or other desirable properties is suitable. Where the material of the particles is heavier than water, the cells of the particles should be isolated one from another so as to prevent the water from permeating the particles and causing them to sink. The particles should possess sufficient rigidity so that the pressure of the water in the softener will not compress them together and close the spaces between them. Such action would restrict the flow of water through the softener in an undesirable manner. It will be understood that whatever water pressure is maintained in the system to which the softener is attached, is also present in the softening tank.

A satisfactory material from which to make the particles is candelilla wax or carnauba wax. Any other vegetable or animal wax having suitable properties of hardness, water insolubility and low specific gravity may be used. The wax may be used in its commercial form after it has been broken up to the proper size. However, increased lightness in weight and greater irregularity of shape and roughness of surface may be imparted by means of a special treatment. This treatment comprises extruding the wax while in a heat-softened condition through a small orifice, about ¹⁄₁₆ to ⅛ inch in diameter, into a bath of water at ordinary temperature. The wax, upon emergence from the orifice and upon entering the water, swells to several times its confined size and takes on a porous and pitted character. It becomes hard in the water and may be removed therefrom and broken up to the desired size. The particles may then be screened, if necessary, to remove the fines which may be returned to the wax supply and heated again.

The particles produced in the above manner are very irregular in shape and have rough and pitted surfaces resembling a sponge. They are very light in weight, weighing in bulk as little as fifteen pounds per cubic foot. The weight may be controlled by regulating the temperature of the water bath into which the wax is extruded. Warm water produces lighter particles than does cold water. The treatment described makes it possible to use wax which normally is heavier than water.

The particles may also be composed of the phenol condensation product known as bakelite, made sufficiently porous to float on water. They may be made from the heat-expanded, cellular, vitrified clay product described and claimed in Slidell United States Patent 1,859,539, granted May 24, 1932. When particles of the latter material are subjected to water under pressure, they may gradually absorb water into the surface pores and become sufficiently heavy to sink in water. To prevent this, the particles should be covered with a thin coating of wax, bakelite, paraffin or other suitable water resistant substance.

It has been found that particles having smooth surfaces and regular shape do not function to retain the zeolite particles as efficiently as do rough and irregularly shaped particles. When smooth and regular particles are used, the upwardly flowing water seems to follow well defined paths between the particles, even though said paths may be tortuous. Under such conditions there is an increased tendency for the zeolite particles to be carried along with the water streams and out of the softening container. Also with such material it is necessary to use smaller particles in order to secure efficient retaining action. Particles of about the same size as the larger zeolite particles are satisfactory. However, particles having irregular shape and rough surfaces break up the continuity of the available paths and hence of the flow, and the streams encounter particles, causing eddies and retarded flow, with the result that the suspended zeolite particles settle back upon any available surface. Furthermore, the rough surfaces of the retaining particles, by the friction they introduce, exert a filtering action and actually remove zeolite particles from the water streams. The zeolite grains lodge in the surface pits of the retaining particles and are held there. The latter are in a continual state of motion and zeolite grains which come to rest on the retaining particles are continually dislodged and find their way back to the top of the zeolite bed. When the upward flow of water stops, the floating particles continue in a state of slight motion which dislodges the zeolite particles, and the latter, being heavier than water, drop back into the zeolite bed.

This same layer of roughened particles also functions as an efficient distributor of the water stream passing therethrough and prevents the converging of the water stream at the upper portion of the zeolite bed. Such convergence would render ineffective the zeolite at the outer portions of the top of the bed.

The piping and valves for causing the water to flow upwardly or downwardly through the container will now be described. The pipe 17 is connected to the hard water supply and to the fitting 18 in which the stream divides and flows upwardly or downwardly to the top or the bottom of the softening container, depending on the valve adjustment. The container itself is adapted for the upward or downward flow therethrough of the water to be softened. With upflow operation during the softening process the incoming water flows downwardly from the fitting 18 through the open valve 19, piping 20, as indicated by the arrows, distributor 11, upwardly through the zeolite bed in which it is softened and through the retarding material above the same and out through the port 13. A short pipe 21 leads upwardly from said outlet port 13 and has a screen 22 across its lower end. This screen need be only of sufficiently fine mesh to retain the floating aggregate or retaining material in the container. The screen may be soldered to the end of the pipe or it may be welded or otherwise secured in place. A T-fitting 23 is connected at one end to pipe 21. The other end of said fitting is closed by means of a plug or cap 24.

The softened water flows upwardly through said T-fitting, through the pipe 25, open valve 26 and open valve 27 through the service pipe 28. It will be understood that at this time the valves 29 and 30 will be closed. Also, the valves 31 and 32 which connect to drain pipes are closed.

After the zeolite 15 has become exhausted, it may be regenerated in the ordinary way. For this operation, valve 19 is closed in order to shut off the water supply to the container 10, and valve 26 is closed also. However, valve 26 may be left open if the operator is willing to use the hard water, flowing in through the pipe 17, during the regenerating operation. Plug 24 is removed from T-fitting 23 and a hopper 33, shown in Fig. 2 is connected in its place. Said hopper is filled with the required quantity of ordinary salt. The salt runs down through the pipe 21, and rests on the screen 22. Valves 29 and 32 are then opened slightly, and water flows from supply pipe 17 through the T-fitting 23 where it dissolves the salt. The solution passes downwardly through the zeolite 15 and regenerates the latter. The brine effluent passes from the bottom of the container through valve 32 to the drain. After the regeneration is complete, the hopper may be removed and the plug reinserted in T-fitting 23, and valves 29 and 32 may be opened further and the brine residue washed completely out of the container. Thereafter the valve system may be set for the normal upflow softening operation.

My improved retaining material is also adapted for use with downflow operation. Said material acts as an excellent distributor for the downwardly flowing water to be softened. During the back-washing operation, the material functions to retain the zeolite particles within the container. The softening and regenerating operations are carried out in the same manner as described heretofore except that the water flows downardly through the zeolite bed during the softening operation. To accomplish such flow the valves 29 and 30 are open and the valves 19 and 26 are shut. During the back-washing operation, which follows the softening operation, valves 19, 26 and 31 are open, and valves 29, 30, 32 and 27 are closed. Raw water passes downwardly from the fitting 18 to the bottom of the container and upwardly through said container, through piping 25, valves 26 and 31 to the drain.

It is understood that the upward flow of water, as recited in the appended claims, in connection with the retaining function of the floating aggregate, contemplates the upward flow during normal upflow softening operation, and also during the back-washing step in ordinary downflow softening operation.

My improved retaining means may also be used in other water treating equipment where water is passed upwardly through a bed of small sized particles. For instance, it may be used where iron removal is practiced by passing the water through a bed of manganese dioxide or pyrolusite. It may also be used in equipment designed for the filtering of water or other liquids, such as gasoline, oils, lacquers, paints, etc., where the upward flow of the liquid is contemplated. The material should be sufficiently light in weight to float upon the liquid treated.

It is understood that the equipment described herein is only one example of apparatus with which the invention may be used. Said invention is applicable to any apparatus in which there is an upward flow of water and a need to retain a material composed of small sized particles against the tendency of the water to carry the particles out of the apparatus.

I claim:

1. In a liquid treating apparatus, the combination with a container having an inlet and an outlet connected to permit the flow of liquid upwardly through said container and a body of small-sized liquid-treating aggregate in said container, said aggregate being somewhat heavier than said liquid but being carried upwardly by an upward current of said liquid, of a layer of particles which are buoyant in said liquid and of such shape and surface characteristics as to retain said aggregate in said container during upward flow of liquid therethrough, and means for retaining said buoyant particles in said container.

2. In a liquid-treating apparatus, the combination with a container having an inlet and an outlet connected to permit the upward flow of liquid through said container, and a body of liquid-treating aggregate in said container, said aggregate being somewhat heavier than said liquid but being carried upwardly by an upward current of said liquid, of means for retaining said aggregate in said container comprising a layer of irregularly shaped and surfaced particles above said aggregate, said particles being buoyant in said liquid and means for retaining said buoyant particles in said container.

3. In a liquid-treating apparatus, the combination with a container having an inlet and an outlet connected to permit the upward flow of liquid through said container, and a body of liquid-treating aggregate in said container, said aggregate being somewhat heavier than said liquid but being carried upwardly by an upward current of said liquid, of means for retaining said aggregate in said container comprising a layer of irregularly shaped and surfaced particles above said aggregate, said particles being buoyant in said liquid and of larger size than said liquid treating aggregate, and means for retaining said buoyant particles in said container.

4. In a liquid-treating apparatus, the combination with a container having an inlet and an outlet connected to permit the upward flow of liquid through said container, and a body of liquid-treating aggregate in said container, said aggregate being somewhat heavier than said liquid but being carried upwardly by an upward current of said liquid, of means for retaining said aggregate in said container comprising a layer of irregularly shaped and surfaced particles above said aggregate, said particles being buoyant in said liquid and substantially filling the space in said container above said liquid-treating aggregate, and means for retaining said buoyant particles in said container.

5. In a water treating apparatus, the combination of a container having connections for the upward flow of water through the same, a body of water-treating material in said container, means for retaining said water-treating material in said container during upward flow of water therethrough, comprising a layer of irregularly shaped particles of wax within said container and above said material, said wax particles having rough, cellular surfaces, and being adapted to float upon water.

6. In a liquid-treating apparatus, the combination with a container having an inlet and an outlet connected to permit the upward flow of liquid through said container, and a body of liquid-treating aggregate in said container, said aggregate being somewhat heavier than said liquid but being carried upwardly by an upward current of said liquid, of means for retaining said aggregate in said container comprising a layer of irregularly shaped and surfaced particles above said aggregate, said particles being buoyant in said liquid and being of a size approximately from one-eighth inch mesh to three-eighths inch mesh, and means for retaining said buoyant particles in said container.

7. Apparatus for treating liquid comprising a container, a mass of particles of treating material in said container, bottom and top connections from said container whereby said liquid may flow upwardly through said mass, said particles being only slightly heavier than the liquid, whereby the upward flow thereof, in the absence of restraining means, would carry said particles out of said container, and a floating screen in said liquid above said mass composed of irregularly shaped lighter particles of hard material, in the surface pits of which said first mentioned particles are caught temporarily and are subsequently dislodged and sink in said liquid.

8. Water treating apparatus comprising a tank having a relatively small opening at the top and at the bottom thereof, to permit the flow of water through said tank, said tank being closed at the ends except for said openings, a bed of heavy, loose aggregate at the bottom of said tank, a bed of particles of zeolite of a specific gravity greater than that of water, above said first mentioned bed and extending into the upper part of said tank, retaining means for said zeolite nearly filling the remaining space in said upper part, thereby substantially eliminating the free board space in said tank and increasing the effective capacity of the apparatus, said retaining means comprising particles larger than said zeolite particles, having an apparent density less than that of water, and having rough, pitted surfaces, whereby said larger particles may float in the water in close formation and thus interfere with the free and unobstructed flow of water between and around said particles and hence permit particles of said zeolite to lodge temporarily against said pitted surfaces and prevent the escape of said zeolite particles from said container.

9. Apparatus for treating liquid comprising a container, a mass of particles of treating material in said container, said particles being comparatively small and somewhat heavier than the liquid, bottom and top connections from said container whereby said liquid may flow upwardly through said mass, and a floating screen in said liquid above said mass to prevent the escape of said particles from said container, said screen comprising irregular, water-insoluble particles, lighter than the liquid, of larger size than said first mentioned particles, and characterized by hard, rough pitted surfaces.

KEMPER SLIDELL.